(12) United States Patent
Iyer (10) Patent No.: US 6,567,423 B1
(45) Date of Patent: May 20, 2003

(54) PARALLEL BIT STUFFING FOR A SERIAL DATA TRANSFER PROTOCOL

(75) Inventor: Venkat Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/437,502

(22) Filed: Nov. 10, 1999

(51) Int. Cl.[7] ................................................. H04J 3/06
(52) U.S. Cl. ....................................................... 370/505
(58) Field of Search ................................. 370/470–472, 370/503, 505–506, 471

(56) References Cited

U.S. PATENT DOCUMENTS 6,442,178 B1 * 8/2002 Arato et al. ................. 370/506

* cited by examiner

Primary Examiner—Chau Nguyen
Assistant Examiner—Scott Waite
(74) Attorney, Agent, or Firm—Blakely, Sokoloff, Taylor & Zafman LLP (57) ABSTRACT

A parallel bit stuffing method acting on a stream of serial data is disclosed. First, an input data segment is segmented from said stream of serial data. Next, a carryover segment is appended to the input data segment to form an address field. The address field is used to correlate to an output field that includes a stuffed data portion and a carryover segment portion. The carryover segment portion is used in a next cycle as the carryover segment. Finally, the stuffed data portion is output as output data segments.

21 Claims, 7 Drawing Sheets

| INPUT BYTE NUMBER | INPUT BYTE DATA | ROM ADDRESS | ROM OUTPUT |
|---|---|---|---|
| 1 | 11111111 | 000 1111111 ⏟113 111 | 11111011X 01 010 ⏟205<br>⏟201  203 |
| 2 | 10010111 | 010 10010111 | 10010111XX 00 011 |
| 3 | 11110110 | 011 1110110 | 11010110X 01 000 |
| 4 | 11111111 | 000 1111111 | 11111011X 01 010 |
| 5 | 11111111 | 010 1111111 | 11101111X 01 100 |
| 6 | 11111111 | 100 1111111 | 11011110 10 000 |

| INPUT BYTE NUMBER | INPUT BYTE DATA | ROM ADDRESS | ROM OUTPUT |
|---|---|---|---|
| 1 | 11111101 | 000 1111110] | 1111111X 01 001] |
| 2 | 11011111 | 001 1011111] | 1011111 10 101] |
| 3 | 10100111 | 101 10100111] | 1100111X 01 011] |
| 4 | 11101111 | 011 11101111] | 1111111X 01 100] |
| 5 | 11011111 | 100 11011111] | 1111111X 01 101] |
| 6 | 10100110 | 101 10100110] | 1100110X 01 000] |

PARALLEL BIT STUFFING FOR A SERIAL DATA TRANSFER PROTOCOL

BACKGROUND OF THE INVENTION

1. Field of the Invention

The present invention relates to bit stuffing in serial data transfer protocols, and more particularly, to a method for bit stuffing in parallel.

2. Background Information

The Universal Serial Bus (USB) is a cable bus that supports data exchange between a host computer (USB host) and a wide range of simultaneously accessible peripherals (USB devices). The USB physical interconnect is a tiered star topology. A hub is at the center of each star. Each wire segment is a point-to-point connection between the USB host and a hub or USB device, or a USB hub connected to another hub or USB device. The USB host contains host controllers that provide access to the USB devices in the system.

The current USB specification employs non-return to zero invert (NRZI) data encoding when transmitting packets. In NRZI encoding, a "1" is represented by no change in voltage level and a "0" is represented by a change in voltage level. Thus, a string of zeros causes the NRZI data to toggle each bit time. A string of ones causes long periods with no transitions in the data.

In order to ensure adequate signal transitions, bit stuffing is employed by the transmitting device when sending a packet on USB. A zero is inserted after every six consecutive ones in the data stream before the data is NRZI encoded, to force a transition in the NRZI data stream. This gives the receiver logic a data transition at least once every seven bit times to guarantee the data and clock lock. Bit stuffing is enabled beginning with the synchronization pattern and throughout the entire transmission.

The receiver of the data must decode the NRZI data, recognize the stuffed bits and discard them. If the receiver sees seven consecutive ones anywhere in the data packet then a bit stuffing error has occurred and the packet should be ignored.

Bit stuffing is inherently serial in nature. This makes it difficult to implement bit stuffing at high data rates. Currently, the USB serial data rate is specified to be 12 Mb/sec. Under a contemplated revision to USB (USB 2.0) this data rate may increase by forty. This makes it difficult for prior art bit stuffing methods to be effective. What is needed is a new method of bit stuffing that can handle high data rates.

SUMMARY OF THE INVENTION

A parallel bit stuffing method acting on a stream of serial data is disclosed. The method receives an input data segment of a predetermined bit length from the stream of serial data. Next, an address field is formed by appending to the input data segment a carryover segment. Using a look-up table stored in read only memory (ROM), the address field is used to correlate to an output field. The output field includes a stuffed data portion and a carryover segment portion. The carryover segment portion is used in a next cycle as the carryover segment. Finally, the stuffed data portion is output as output data segments of predetermined bit length.

BRIEF DESCRIPTION OF DRAWINGS

The present invention will be described in conjunction with the FIGURES, wherein.

DETAILED DESCRIPTION OF THE INVENTION

Figure 1:
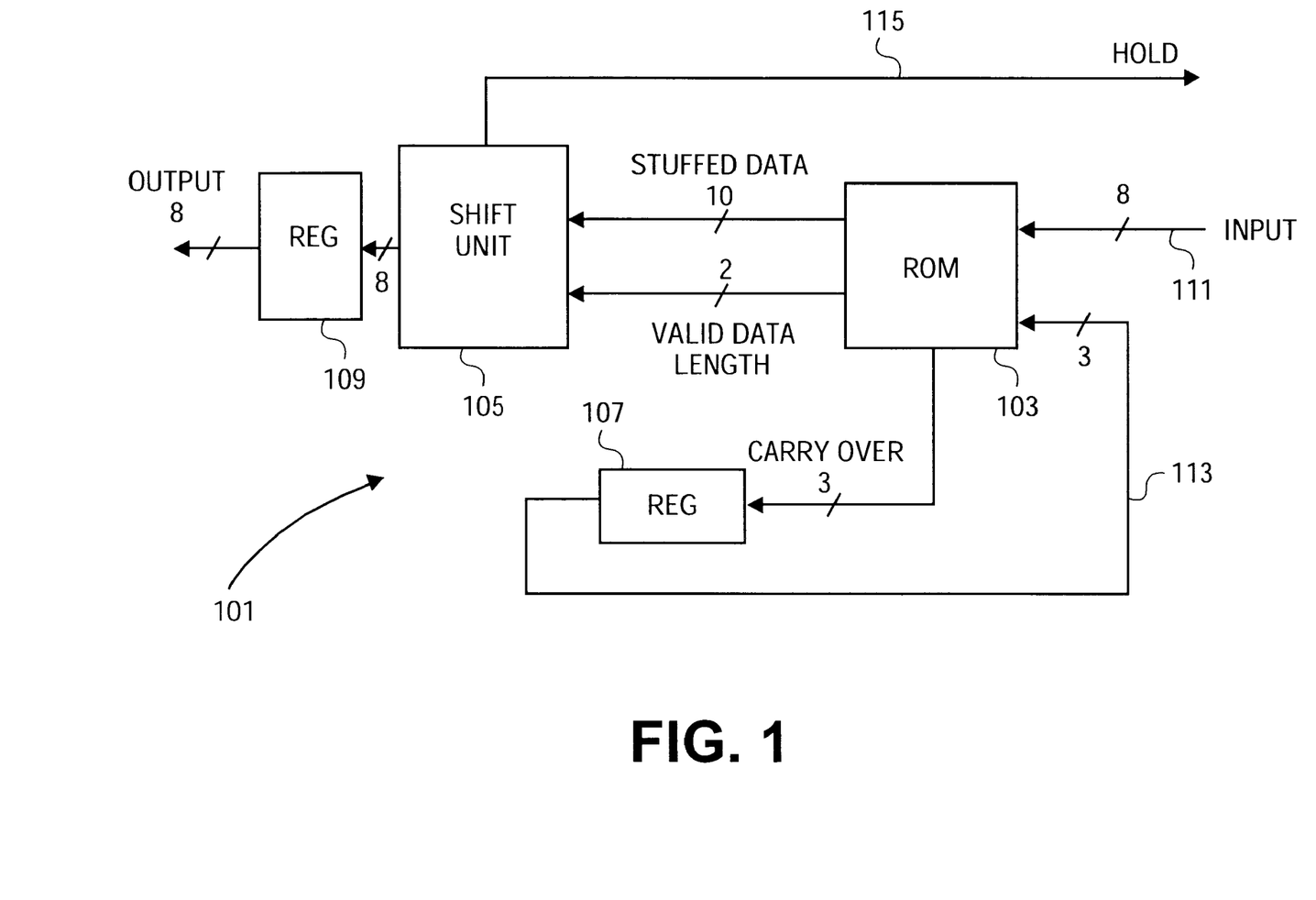
FIG. 1 is a schematic diagram illustrating an apparatus for parallel bit stuffing in accordance with the present invention.

FIG. 1 shows a schematic diagram of an apparatus 101 used for implementing parallel bit stuffing in accordance with the present invention. The bit stuffing apparatus 101 includes a read only memory (ROM) 103, a shift unit 105, a first register 107, and a second register 109. The bit stuffing apparatus 101 operates on a byte of data in every clock cycle. It can be appreciated that each of the components noted above includes a synchronous clock input that is used to regulate the timing of the bit stuffing operation. For simplicity, the clock input lines are not shown in FIG. 1.

Data that is to be processed by bit stuffing is provided on an input line 111. The data is provided in parallel as an 8-bit byte. Each byte of data is input on input line 111 to the read only memory 103. Also provided as an input to the ROM 103 is a 3-bit data signal from the first register 107. The 3-bit data signal is carried along data line 113. The combination of the 3-bit data signal from the first register 107 and the 8-bit byte carried along input line 111 form an 11-bit input address. As will be seen in greater detail below, the 3-bit data signal along data line 113 correlates to the number of "1"'s that follow the last "0" in the preceding byte that was processed.

The ROM 103 is simply a large look-up table that uniquely correlates each distinctive 11-bit input address with a 15-bit output. The 15-bit output is comprised of three portions. Specifically, turning to FIG. 2, the 15-bit output from the ROM 103 comprises a 10-bit data portion 201, a 2-bit valid data length portion 203, and a 3-bit carryover portion 205.

Figure 2:
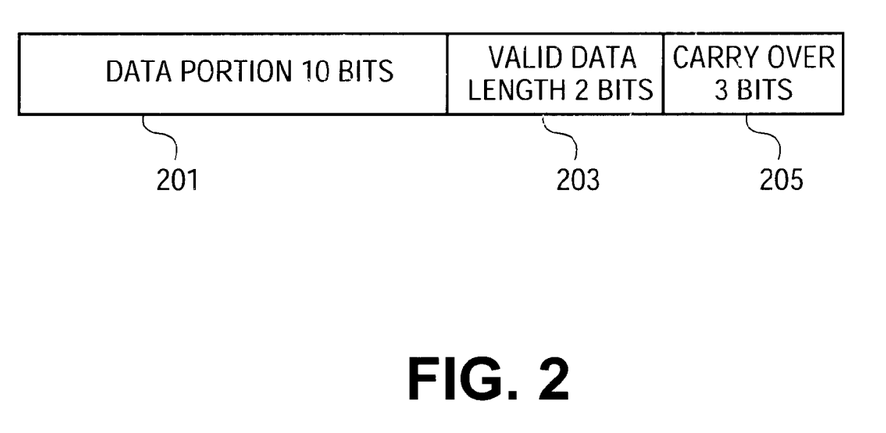
FIG. 2 illustrates the format of the output of the read only memory for the bit stuffing apparatus of the present invention.

The 3-bit carryover portion 205 is provided as the input to the first register 107. The first register 107 simply is a delay register which outputs a 3-bit data signal on line 113 that is the carryover portion 205 received from ROM 103 in the previous clock cycle.

The valid data length portion 203 is provided to the shift unit 105 and is a signal that indicates to the shift unit 105 how many of the bits in the 10-bit data portion 201 are valid. As will be seen with further detail below, of the 10 bits that are output by the ROM 103, either 8 bits, 9 bits, or 10 bits may be valid data. The 2-bit valid data length portion 203 can provide a digital representation as to whether or not 8 bits, 9 bits, or 10 bits are valid for the shift unit 105. For example, if the 2-bit valid data length portion 203 is "00" in the preferred embodiment, this means that 8 bits of the data portion 201 received from the ROM 103 are valid. If the 2-bit valid data length portion 203 is "01", in the preferred embodiment, this means that 9 bits of the data portion 201 received from the ROM 103 are valid. Finally, if the 2-bit valid data length portion 203 is "10" in the preferred embodiment, this means that all 10 bits of the data portion 201 received from the ROM 103 are valid.

Figure 3:
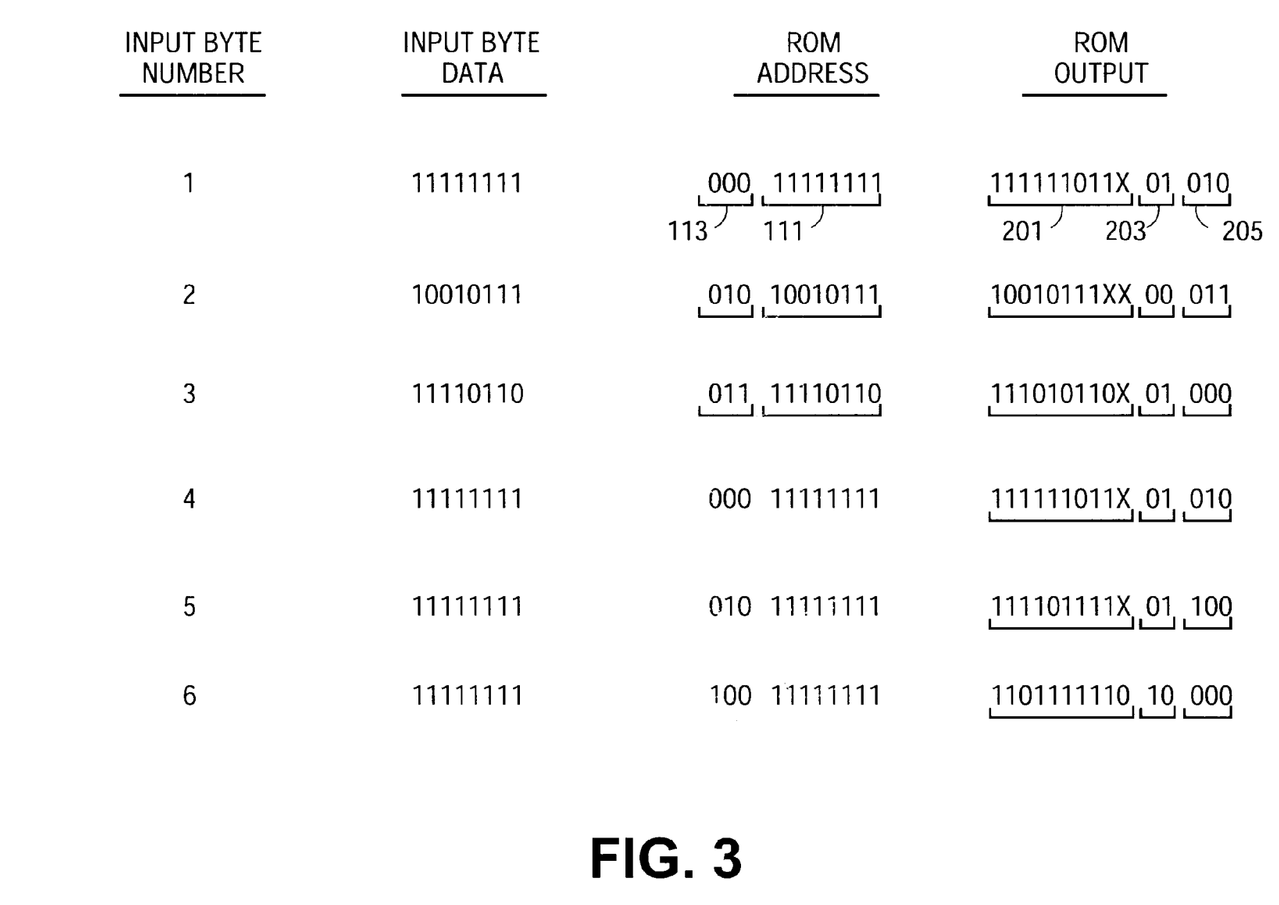
FIG. 3 is a table showing the processing of an example series of input bytes during bit stuffing by the present invention.

To see how the ROM 103 translates and performs the bit stuffing procedure, FIG. 3 shows examples of bytes of input data that are provided to the ROM 103. Specifically, FIG. 3 shows a sequence of bytes numbered 1–6 that are input into the ROM 103. The bytes shown in FIG. 3 are arbitrary and are chosen only to illustrate the present invention.

As noted above, the input address that is input into the ROM 103 is a combination of the 3-bit data signal on line 113 concatenated with the input byte. In FIG. 3, the first byte input into the ROM 103 is a series of eight "1"'s. The ROM input address is thus the 3-bit data signal carried on data line 113 combined with the input byte data carried on input line 111. In this particular case, because this is the first byte to be processed, the first register 107 places three '0's on the data line 113. The input byte is appended verbatim to the ROM input address. Thus, the input address to the ROM is "00011111111". The ROM 103 includes a look-up table that contains a unique 15-bit output for every unique 11-bit input address. The data portion 201 of the 15-bit output is determined by the bit stuffing algorithm. In the case of USB, a zero is inserted after every series of six consecutive ones. Thus, the data portion 201 of the 15-bit output must be designed with this bit stuffing algorithm in mind.

In this case, because the ROM input address is 3 '0's followed by 8 '1's, the ROM 15-bit output has a data portion 201 that comprises 6 '1's, followed by a bit stuffed '0', followed by 2 '1's and a don't care (X) bit. This comprises the data portion 201 of the ROM output. Also provided in the ROM 15-bit output is the 2 bit valid data length portion 203. As noted above, this indicates how many of the 10-bits of data portion 201 contain valid data. In this case, nine of the bits are valid data and the tenth field is a "don't care" (denoted by "X" in FIG. 3). Therefore, the valid data length portion 203 includes the data "01" that indicates that 9 bits are to be considered valid.

As noted above, the data pattern "01" is arbitrarily chosen to represent that 9-bits are valid. If 8 bits are valid in the data portion 201, then the valid data length portion 203 would contain "10" and if all ten bits are valid, then the valid data length field 203 would contain "10". The foregoing is exemplary only and it can be appreciated by those skilled in the art that the valid data length portion 203 may contain any combination of 2 bits to associate with the validity of 8, 9, and 10 bits, respectively.

Finally, the 15-bit output from the ROM includes the carryover portion 205. This field indicates how many '1's are present at the end of the data portion 201 that follow the last '0'. In this case, the data portion 201 includes two '1's that follow a '0'. This is represented in the carryover portion 205 as the binary number "010". If there were no '1's following a '0' at the end of the data portion, i.e., no carryover '1's, then the carryover portion 205 would read "000". If there were six '1's at the end of the data portion 201 following a '0', then the carryover portion 205 would read "110".

The 15-bit output of the ROM is parsed to deliver the data portion 201 and the valid data length portion 203 to the shift unit 105. The carryover portion 205 is passed to the first register 107. The first register 107 stores the carryover portion 205 for one cycle and outputs the same carryover portion 205 onto data line 113 for the next input byte to be processed. Thus, in FIG. 3, note that the carryover portion 205 of the 15-bit output is always identical to the first 3-bits of the ROM input address for the next input byte.

The data portion 201 (which carries the bit stuffed byte) is carried on a parallel 10-bit line to the shift unit 105. The valid data length portion 203 is carried on a parallel 2-bit line to the shift unit 105. The shift unit 105 operates on the stuffed data portion 201 as follows. The shift unit 105 receives the data portion 201 and based upon the signal along the valid data length portion 203, processes either 8, 9, or 10 bits of the data portion 201. In the case of the first processed data portion 201 in FIG. 3, the valid data length field contains "01", which indicates that 9 bits of the data portion 201 is valid. Therefore, the shift unit 105 will process only 9 of the bits in the data portion 201. The shift unit 105 is operative to receive the first 8 bits of the data portion 201 and output those 8 bits to the second register 109. The $9^{th}$ bit is placed in a queue for output during the next cycle. In this case, the shift unit 105 would output the 8-bit byte "11111101" and store a "1" in the queue.

When the second processed data portion 201 shown in FIG. 3 is output by the ROM 103 during the next clock cycle, the valid data bits of the second processed data portion 201 are sequentially added to the queue until a complete 8-bit byte is formed. Continuing the example of above, 1 bit is stored in the queue of the shift unit 105 from the first cycle, and thus, the next 7 bits from the second data portion 201 from the ROM 103 is loaded into the queue. Those 8 bits are then output to the second shift register 109. In the specific example shown in FIG. 3, the second byte output by the shift unit 105 would consist of the following byte: "11001011". The $8^{th}$ bit of the second 10-bit data portion 201 (which is a "1") would be stored in the queue.

Continuing with the example, the third data portion 201 output by the ROM 103 consists of 9 bits. Seven of those bits are provided to the queue of the shift unit 105. Thus, the shift unit 105 would output an 8-bit byte comprising: "11110101". The remaining last 2 bits of the third data portion 201 would be stored in the queue as "10". This process continues indefinitely while the parallel bit stuffing apparatus 101 processes the input bytes.

Importantly, when the shift unit 105 has 8 bits stored in it's queue, a hold signal is transmitted by the shift unit 105 along a hold line 115 to the circuitry that provides the input bytes to the ROM 103. This hold signal holds the input of data for one clock cycle allowing the shift unit to clear it's queue of the 8 bit byte that has been stored in the queue. After this has been accomplished, additional input bytes may be processed by the bit stuffing apparatus 101.

Finally, the second register 109 receives the output byte from the shift unit 105 and outputs the byte to a transceiver (not shown) for transmission along the serial data bus. The transceiver converts the 8-bit byte from parallel format into serial data that can be passed onto a serial bus.

The creation of the programming of the ROM 103 is straightforward. Because the ROM input address is comprised of 11 bits total, the total number of entries in the look-up table stored by the ROM 103 is $2^{11}$ or 2,048 entries. For each entry, there is a 15-bit output. Therefore, the total number of bits required for the ROM is on the order of 33,000 or 33K of ROM.

Note that the ROM 103 has a predetermined 15-bit output associated with every ROM input address. For example, in entries 1 and 4 of FIG. 3, the ROM input address is precisely the same and the 15-bit output is precisely the same in both cases. This despite the fact that two intermediate bytes were processed by the bit stuffing apparatus 101. Additionally, as can be seen, when a series of input bytes all containing '1's are provided to the bit stuffing apparatus 101 (as seen in input bytes 4, 5, and 6 of FIG. 3), the 15-bit output for input byte number 6 contains the full 10 bits and each bit of the data portion 201 is valid. Therefore, the valid data length portion 203 for the 15-bit output for row 6 is "10".

Figure 4:
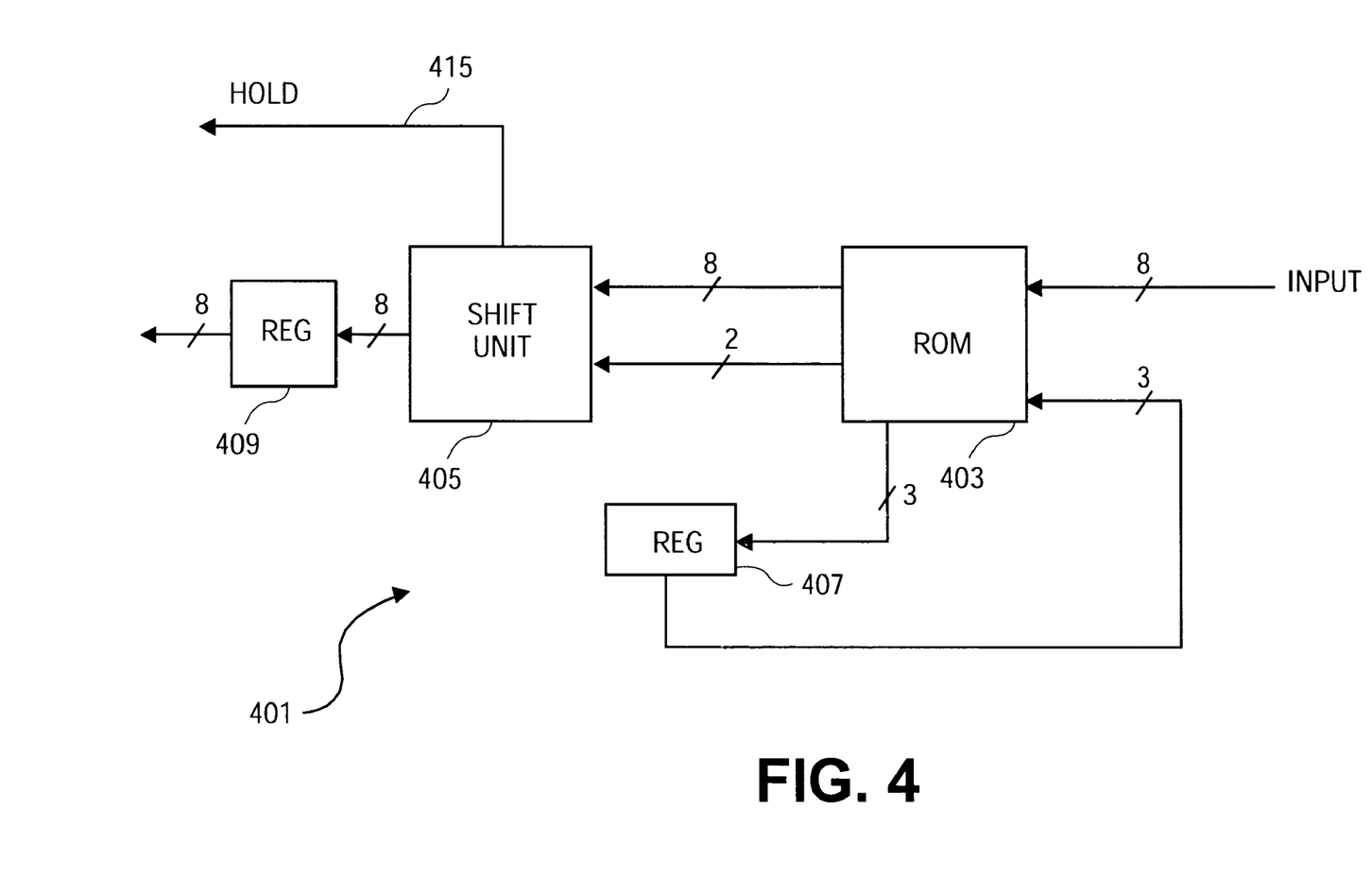
FIG. 4 is a schematic diagram illustrating an apparatus for parallel bit unstuffing in accordance with the present invention

Next, turning to FIG. 4, an apparatus 401 for unstuffing bits from a serial data stream is shown. Note that the unstuffing apparatus 401 operates on bytes of data input in parallel. Therefore, a receiver (not shown) must be provided for converting a serial data stream into a parallel stream.

The unstuffing apparatus 401 architecturally looks very similar to the bit stuffing apparatus 101 of FIG. 1. As the bytes are input in parallel into a ROM 403, a 3-bit data signal is provided from a first register 407. Thus, the input to the ROM 403 is once again an 11-bit input address. The 11-bit address comprises the 3-bits from the first register 407 and the 8-bit byte being processed. The ROM 403 is simply a large look-up table that uniquely correlates each distinctive 11-bit input address with a 13-bit output.

Figure 5:
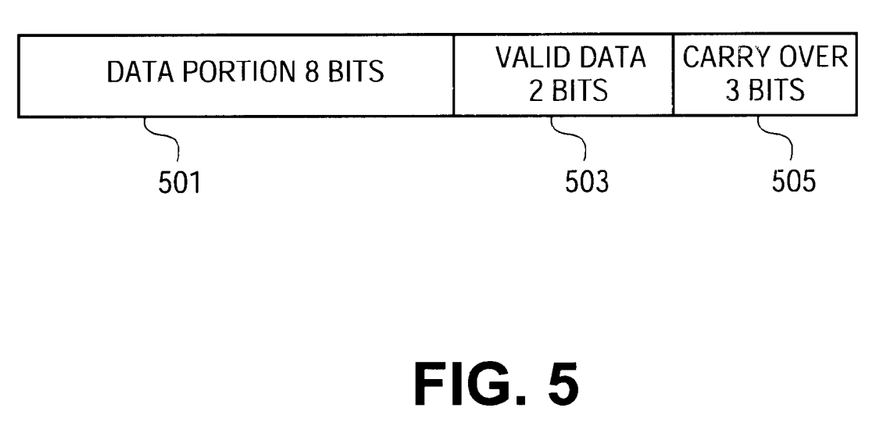
FIG. 5 illustrates the format of the output of the read only memory for the bit unstuffing apparatus of in the present invention.

The ROM 403 provides a 13-bit output. The 13-bit output comprises three portions as shown in FIG. 5. The 13-bit output includes an 8-bit data portion 501, a 2-bit valid data portion 503, and a 3-bit carryover portion 505.

The 3-bit carryover portion 505 is provided as the input to the first register 407. The first register 407 simply is a delay register which outputs a 3-bit data signal to the ROM 403 that is the carryover portion 505 received from ROM 403 in the previous clock cycle.

The valid data portion 503 is provided to a shift unit 405 and is a signal that indicates to the shift unit 405 how many of the bits in the 8-bit data portion 501 are valid. As will be seen with further detail below, of the 8 bits that are output by the ROM 403, either 6 bits, 7 bits, or 8 bits may be valid data. The 2-bit valid data length portion 503 can provide a digital representation as to whether or not 6 bits, 7 bits, or 8 bits are valid for the shift unit 405. For example, if the 2-bit valid data length portion 503 is "00", in the preferred embodiment, this means that 6 bits of the data portion 501 received from the ROM 403 are valid. If the 2-bit valid data length portion 503 is "01", in the preferred embodiment, this means that 7 bits of the data portion 501 received from the ROM 403 are valid. Finally, if the 2-bit valid data length portion 503 is "10", in the preferred embodiment, this means that all 8 bits of the data portion 501 received from the ROM 403 are valid.

Figure 6:
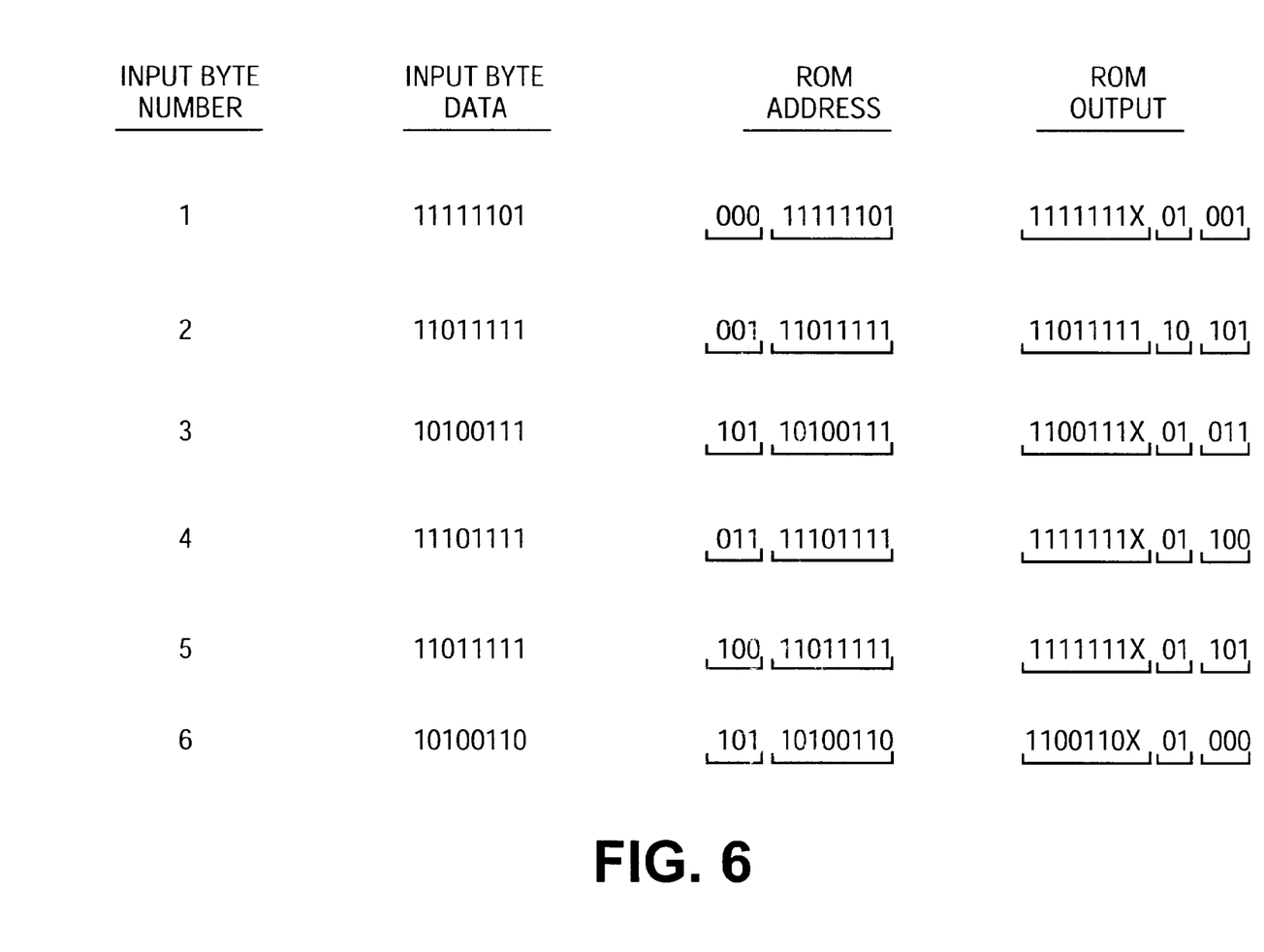
FIG. 6 is a table showing the processing of an example series of input bytes during bit unstuffing by the present invention.

To see how the ROM 403 translates and performs the bit stuffing procedure, FIG. 6 shows examples of bytes of input data that are provided to the ROM 403. Specifically, FIG. 6 shows a sequence of bytes numbered 1–6 that are input into the ROM 403. Like the bytes shown in FIG. 3 above, the bytes shown in FIG. 6 are arbitrary and are chosen only to illustrate the present invention.

The input address that is input into the ROM 403 is a combination of the 3-bit data signal concatenated with the input byte. In FIG. 6, the first byte input into the ROM 403 is "11111101". The ROM input address is thus the 3-bit data signal from first register 407 combined with the input byte data. In this particular case, because this is the first byte to be processed, the first register 407 places outputs "000". The input byte is appended verbatim to the ROM input address. Thus, the first input address to the ROM 403 is "00011111101". The ROM 403 includes a look-up table that contains a unique 13-bit output for every unique 11-bit input address.

The data portion 501 of the 13-bit output is determined by the bit unstuffing algorithm. In the case of USB, a zero that follows six consecutive ones is removed or deleted. Thus, the data portion 501 of the 13-bit output must be designed with this bit stuffing algorithm in mind.

In this case, because the ROM input address is 3 '0's followed by "11111101", the ROM 13-bit output has a data portion 501 that comprises seven consecutive '1's followed by a don't care (X) bit. In other words, the ROM 403 recognizes that the zero in the input byte was bit stuffed and should be removed. This comprises the data portion 501 of the ROM output.

Also provided in the ROM 13-bit output is the 2 bit valid data portion 503. As noted above, this indicates how many of the 8-bits of data portion 501 contain valid data. In this case, seven of the bits are valid data and the eighth field is a "don't care" (denoted by "X" in FIG. 6). Therefore, the valid data length portion 503 includes the data "01" that indicates that 7 bits are to be considered valid.

As noted above, the data pattern "01" is arbitrarily chosen to represent that 7 bits are valid. If 6 bits are valid in the data portion 501, then the valid data portion 503 would contain "00" and if all 8 bits are valid, then the valid data portion 503 would contain "10". The foregoing is exemplary only and it can be appreciated by those skilled in the art that the valid data portion 503 may contain any combination of 2 bits to associate with the validity of 6, 7, and 8 bits, respectively.

Finally, the 13-bit output from the ROM includes the carryover portion 505. This field indicates how many '1's are present at the end of the data portion 501 that follow the last '0'. In this case, the data portion 501 includes a single '1' that follows a '0'. This is represented in the carryover portion 505 as the binary number "001". If there were no '1's following a '0' at the end of the data portion, i.e., no carryover '1's, then the carryover portion 505 would read "000". If there were six '1's at the end of the data portion 501 following a '0', then the carryover portion 505 would read "110".

The 13-bit output of the ROM 403 is parsed to deliver the data portion 501 and the valid data portion 503 to the shift unit 405. The carryover portion 505 is passed to the first register 407. The first register 407 stores the carryover portion 505 for one cycle and outputs the same carryover portion 505 to the ROM 403 for use with the next input byte to be processed. Thus, in FIG. 6, note that the carryover portion 505 of the 13-bit output is always identical to the first 3-bits of the ROM input address for the next input byte.

The data portion 501 (which carries the unstuffing data) is carried on a parallel 8-bit line to the shift unit 405. The valid data portion 503 is carried on a parallel 2-bit line to the shift unit 405. The shift unit 405 operates on the stuffed data portion 501 as follows. The shift unit 405 receives the data portion 501 and based upon the signal along the valid data length portion 503, processes either 6, 7, or 8 bits of the data portion 501. In the case of the first processed data portion 501 in FIG. 6, the valid data length field contains "01", which indicates that 7 bits of the data portion 501 is valid. Therefore, the shift unit 405 will process only 7 of the bits in the data portion 501. The shift unit 405 is operative to receive the 7 bits of the data portion 501 and stores these bits into a queue for output during the next cycle. In this case, the shift unit would store "1111111" in the queue.

Importantly, when the shift unit 405 does not have the full 8 bits stored in it's queue to form a byte, a hold signal is transmitted by the shift unit 405 along a hold line 415 to the circuitry that processes the output bytes of the receiver. This hold signal holds the output of the data for one clock cycle allowing the shift unit 405 to fill it's queue of the 8 bit byte. After this has been accomplished, additional output bytes may be pulled from the bit unstuffing apparatus 401.

When the second processed data portion 501 is output by the ROM 403 during the next clock cycle, the valid data bits of the second processed data portion 501 are sequentially added to the queue until a complete 8-bit byte is formed. Continuing the example of above, seven bits are stored in the queue of the shift unit 405 from the first cycle, and thus, the first bit from the second processed data portion 501 from the ROM 403 is loaded into the queue. Those 8 bits are then output to the second shift register 409. In the specific example shown in FIG. 6, the first byte to be output by the shift unit 405 would consist of the following byte: "11111111". The next seven bits of the second 8-bit data portion 501 (which is "1011111") would be stored in the queue.

Continuing with the example, the third processed data portion 501 output by the ROM 503 consists of 7 bits. The first of those bits is provided to the queue of the shift unit 405 to complete a byte (coupled from the 7 bits already stored in the queue). Thus, the shift unit 405 would output an 8-bit byte comprising: "10111111". The remaining last 6 bits of the third data portion 501 would be stored in the queue as "100111". This process continues indefinitely while the parallel bit stuffing apparatus 101 processes the input bytes.

Finally, the second register 409 receives the output byte from the shift unit 405 and outputs the byte to circuitry (not shown) for processing.

The creation of the programming of the ROM 403 is straightforward. Because the ROM input address is comprised of 11 bits total, the total number of entries in the look-up table stored by the ROM 103 is $2^{11}$ or 2,048 entries. For each entry, there is a 13-bit output. Therefore, the total number of bits required for the ROM is on the order of 28,000 or 28K of ROM. Note that the ROM 503 has a predetermined 13-bit output associated with every ROM input address.

Figure 7:
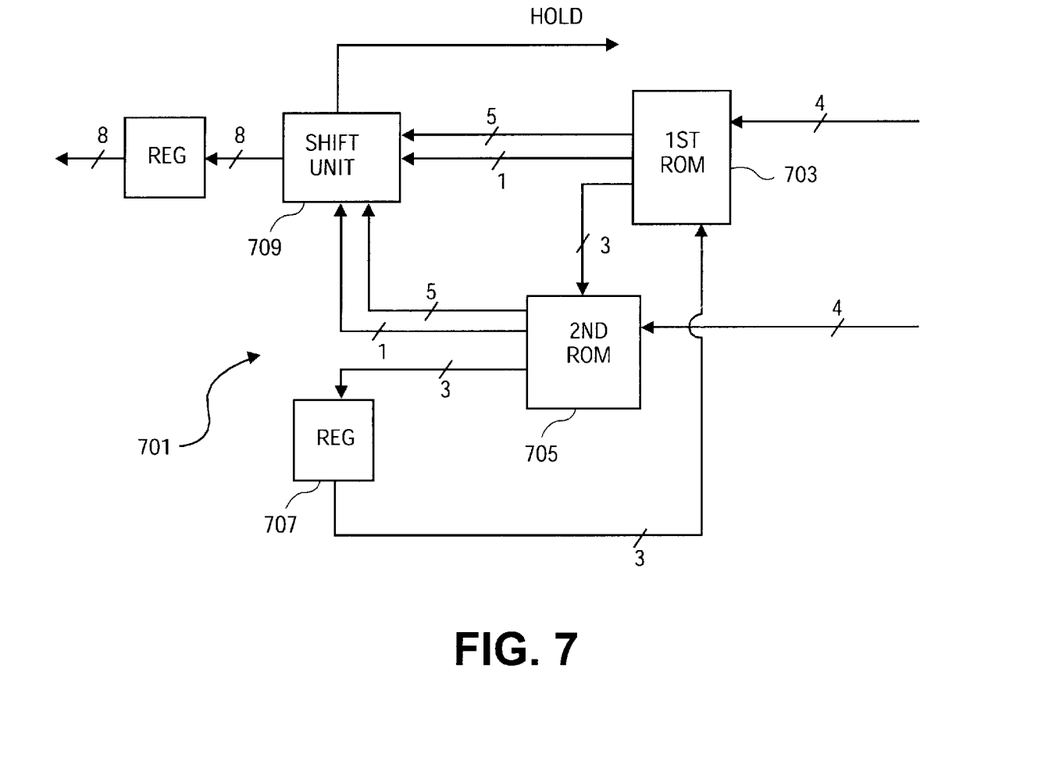
FIG. 7 is a schematic diagram illustrating an apparatus for parallel bit stuffing using two read only memory devices each acting on four bits in accordance with the present invention.

Turning next to FIG. 7, an alternative embodiment of a bit stuffing apparatus 701 is shown. The operation of this embodiment is substantially similar to that shown in FIGS. 1–3, except that two ROMs are provided 703 and 705, each ROM operating on 4-bits of an 8-bit byte. The advantage of this embodiment is that the size of each ROM may be reduced. Specifically, the input address of each ROM is 7-bits long and the output of the ROM is 9-bits long. Thus, the total number of entries in the look-up table stored by the ROMs 703 and 705 are $2^7$ or 128 entries. For each entry, there is a 9-bit output. Therefore, the total number of bits required for each ROM is only about 1,300 or 1.3K of ROM, giving a total ROM capacity of 2.6K for both ROMs.

The operation of the embodiment of FIG. 7 is substantially the same as that for the preferred embodiment of FIG. 1. Specifically, the input data byte is separated into the four most significant bits (MSB) and the four least significant bits (LSB). The four MSBs are input into the first ROM 703 and the four LSBs are input into the second ROM 705.

The first ROM 703 also has as an input a 3-bit data signal from a first register 707. The combination of the 3-bit data signal from the first register 707 and the 4-bit byte form a 7-bit input address. As will be seen in greater detail below, the 3-bit data signal correlates to the number of "1"'s that follow the last "0" in the four LSBs processed by second ROM 705 during the preceding clock cycle.

The first ROM 703 is simply a look-up table that uniquely correlates each distinctive 7-bit input address with a 9-bit output. The 9-bit output is comprised of three portions. Specifically, the 9-bit output from the first ROM 703 comprises a 5-bit data portion, a 1-bit valid data length portion, and a 3-bit carryover portion. The 3-bit carryover portion is provided as an input to the second ROM 705.

The valid data length portion is provided to a shift unit 709 and is a signal that indicates to the shift unit 709 how many of the bits in the 5-bit data portion are valid. As will be seen with further detail below, of the 5 bits that are output by the first ROM 703, either 4 bits or 5 bits may be valid data. The 1-bit valid data portion can provide a digital representation as to whether or not 4 bits or 5 bits are valid for the shift unit 709. For example, if the 1-bit valid data portion is "0", in the preferred embodiment, this means that 4 bits of the data portion received from the first ROM 705 are valid. If the 1-bit valid data portion is "1", in the preferred embodiment, this means that 5 bits of the data portion received from the first ROM 705 are valid.

The ROM 705 translates and performs the bit stuffing procedure the same as in the preferred embodiment and that description will not be repeated.

The 9-bit output from the first ROM 703 includes a carryover portion. This field indicates how many '1's are present at the end of the data portion that follow the last '0'. If there were no '1's following a '0' at the end of the data portion, i.e., no carryover '1's, then the carryover portion would read "000". If there were four '1's at the end of the data portion, then the carryover portion would read "100".

The 9-bit output of the ROM is parsed to deliver the data portion and the valid data portion to the shift unit 709. The carryover portion is passed to the second ROM 705.

The second ROM 705 operates substantially similar to the first ROM 703. Specifically, the second ROM 705 also has as an input a 3-bit carryover portion from the first ROM 703. The combination of the 3-bit carryover portion from the first ROM 703 and the 4-bit LSB form a 7-bit input address. As noted above, the 3-bit carryover portion correlates to the number of "1"'s that follow the last "0" in the four MSBs processed by first ROM 703.

The second ROM 705 is simply a look-up table that uniquely correlates each distinctive 7-bit input address with a 9-bit output. Like the first ROM 703, the 9-bit output is comprised of three portions. Specifically, the 9-bit output from the second ROM 705 comprises a 5-bit data portion, a 1-bit valid data portion, and a 3-bit carryover portion. The 3-bit carryover portion is provided as an input to the first register 707.

The valid data length portion is provided to the shift unit 709 and is a signal that indicates to the shift unit 709 how many of the bits in the 5-bit data portion are valid. As will be seen with further detail below, of the 5 bits that are output by the second ROM 705, either 4 bits or 5 bits may be valid data. The 1-bit valid data portion can provide a digital representation as to whether or not 4 bits or 5 bits are valid for the shift unit 709. For example, if the 1-bit valid data portion is "0", in the preferred embodiment, this means that 4 bits of the data portion received from the second ROM 705 are valid. If the 1-bit valid data portion is "1", in the preferred embodiment, this means that 5 bits of the data portion received from the second ROM 703 are valid.

The ROM 703 translates and performs the bit stuffing procedure similarly as in the preferred embodiment and that description will not be repeated.

The 9-bit output from the second ROM 705 includes a carryover portion. This field indicates how many '1's are present at the end of the data portion that follow the last '0'. If there were no '1's following a '0' at the end of the data portion, i.e., no carryover '1's, then the carryover portion would read "000". If there were four '1's at the end of the data portion, then the carryover portion would read "100".

The 9-bit output of the ROM is parsed to deliver the data portion and the valid data portion to the shift unit 709. The carryover portion is passed to the first register 707. The first register 707 stores the carryover portion from the second ROM 707 for one cycle and outputs the same carryover portion for input into the first ROM 703 for the next input byte to be processed. Thus, the first register 707 simply is a delay register.

Thus, the data portion from both the first and second ROMs are provided to the shift unit 709. The shift unit 709 operates on the data portions the same as in the preferred embodiment and that will not be described again.

While the preferred embodiment of the invention has been illustrated and described, it will be appreciated that various changes can be made therein without departing from the spirit and scope of the invention. For example, although in the two embodiments described above, one or two ROMs are used, four or even eight ROMs may be used, each acting on 2-bits and 1-bit, respectively. Further, the data output by the ROMs may be examined to determine if there has been a bit stuffing error by looking for predetermined patterns.

What is claimed is:

1. A parallel bit stuffing method acting on a stream of serial data, the method comprising:
   receiving an input data segment of a predetermined bit length from said stream of serial data;
   appending to said input data segment a carryover segment to form an address field;
   using said address field to correlate to an output field, said output field including a stuffed data portion and a carryover segment portion, said carryover segment portion used in a next cycle as said carryover segment; and
   outputting said stuffed data portion as output data segments of predetermined bit length.

2. The method of claim 1 wherein said output data segments are 8-bits in length.

3. The method of claim 1 wherein said input data segment is 8-bits in length.

4. The method of claim 1 wherein said correlation of said address field and said output is performed using a look-up table stored in memory.

5. The method of claim 1 wherein said stuffed data portion includes stuffed bits and is as large as said input data segment plus the number of said stuffed bits.

6. The method of claim 5 wherein said output field also includes a valid data length portion that is indicative of the number of bits of said stuffed data portion that are valid.

7. The method of claim 1 wherein said carryover segment is indicative of the number of logic ones that were at the end of a stuffed data portion in a previous cycle.

8. The method of claim 1 wherein each unique binary address field correlates to an output field.

9. The method of claim 1 wherein the step of outputting said stuffed data portion as output data segments comprises:
   using a shift unit to receive a sequence of said stuffed data portions;
   outputting from said shift unit said output data segments in said predetermined bit lengths;
   sending a hold signal to said stream of serial data when said shift unit reaches a predetermined capacity.

10. A method of unstuffing bits from a stream of serial data, the method comprising:
    receiving an input data segment of a predetermined bit length from said stream of serial data;
    appending to said input data segment a carryover segment to form an address field;
    using said address field to correlate to an output field, said output field including an unstuffed data portion and a carryover segment portion, said carryover segment portion used in a next cycle as said carryover segment; and
    outputting said unstuffed data portion as output data segments of predetermined bit length.

11. The method of claim 10 wherein said output data segments are 8-bits in length.

12. The method of claim 10 wherein said input data segment is 8-bits in length.

13. The method of claim 10 wherein said correlation of said address field and said output is performed using a look-up table stored in memory.

14. The method of claim 10 wherein said output field also includes a valid data length portion that is indicative of the number of bits of said unstuffed data portion that are valid.

15. The method of claim 10 wherein said carryover segment is indicative of the number of logic ones that were at the end of an unstuffed data portion in a previous cycle.

16. The method of claim 10 wherein each unique binary address field correlates to an output field.

17. The method of claim 10 wherein the step of outputting said unstuffed data portion as output data segments comprises:
    using a shift unit to receive a sequence of said stuffed data portions;
    outputting from said shift unit said output data segments in said predetermined bit lengths;
    sending a hold signal to a receiving circuit when said shift unit does not have sufficient bits to form said output data segment.

18. A parallel bit stuffing apparatus that acts on a stream of serial data, the apparatus comprising:
    a read only memory (ROM) that contains a look-up table, said look-up table correlating an address field to an output field, said address field comprised of an input data segment of a predetermined bit length from said stream of serial data and a carryover segment, said ROM providing as its output a stuffed data portion and a carryover segment portion;
    a delay register for receiving said carryover segment portion and providing said carryover segment portion as said carryover segment in a next cycle; and
    a shift unit for receiving said stuffed data portion and outputting output data segments of predetermined bit length.

19. The apparatus of claim 18 wherein said shift unit includes a hold signal transmitter for transmitting a hold signal to said stream of serial data when said shift unit reaches a predetermined capacity.

20. A bit unstuffing apparatus that acts on a stream of serial data, the apparatus comprising:

a read only memory (ROM) that contains a look-up table, said look-up table correlating an address field to an output field, said address field comprised of an input data segment of a predetermined bit length from said stream of serial data and a carryover segment, said ROM providing as its output an unstuffed data portion and a carryover segment portion;

a delay register for receiving said carryover segment portion and providing said carryover segment portion as said carryover segment in a next cycle; and a shift unit for receiving said unstuffed data portion and outputting output data segments of predetermined bit length.

21. The apparatus of claim 20 wherein said shift unit includes a hold signal transmitter for transmitting a hold signal forward to a receiving circuitry when said shift unit does not have sufficient bits to form said output data segment.

* * * * *

UNITED STATES PATENT AND TRADEMARK OFFICE
CERTIFICATE OF CORRECTION

PATENT NO. : 6,567,423 B1 Page 1 of 1
DATED : May 20, 2003
INVENTOR(S) : Iyer

It is certified that error appears in the above-identified patent and that said Letters Patent is hereby corrected as shown below:

Column 3,
Line 49, delete "10", insert -- 00 --.

Column 6,
Line 51, delete "unstuffing", insert -- unstuffed --.

Signed and Sealed this

Second Day of December, 2003

JAMES E. ROGAN
*Director of the United States Patent and Trademark Office*